(12) United States Patent
Lee et al.

(10) Patent No.: US 9,100,856 B2
(45) Date of Patent: Aug. 4, 2015

(54) ROUTING ARCHITECTURE FOR CONTENT IN A NETWORK

(71) Applicant: Verizon Patent and Licensing Inc., Basking Ridge, NJ (US)

(72) Inventors: Jay J. Lee, San Ramon, CA (US); Deepak Kakadia, Union City, CA (US); Javier M. Lopez, Alameda, CA (US); Taher Farkhondeh, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 289 days.

(21) Appl. No.: 13/693,577

(22) Filed: Dec. 4, 2012

(65) Prior Publication Data

US 2014/0153400 A1   Jun. 5, 2014

(51) Int. Cl.
*H04W 28/02* (2009.01)
*H04L 12/721* (2013.01)
*H04L 29/08* (2006.01)
*H04W 4/18* (2009.01)

(52) U.S. Cl.
CPC ......... *H04W 28/0289* (2013.01); *H04L 45/124* (2013.01); *H04L 67/101* (2013.01); *H04L 67/1021* (2013.01); *H04W 4/18* (2013.01); *H04L 67/2852* (2013.01); *H04L 67/2885* (2013.01)

(58) Field of Classification Search
CPC .. H04W 28/0289; H04W 4/18; H04L 45/124; H04L 67/101; H04L 67/1021; H04L 67/1023; H04L 67/2852; H04L 67/2885
See application file for complete search history.

(56) References Cited

U.S. PATENT DOCUMENTS

| | | | |
|---|---|---|---|
| 2005/0188073 A1* | 8/2005 | Nakamichi et al. | 709/223 |
| 2006/0075082 A1* | 4/2006 | Haga et al. | 709/223 |
| 2008/0184119 A1* | 7/2008 | Eyal et al. | 715/719 |
| 2010/0121969 A1* | 5/2010 | Levitan | 709/231 |
| 2010/0312824 A1* | 12/2010 | Smith et al. | 709/203 |
| 2012/0054266 A1* | 3/2012 | Kazerani et al. | 709/203 |
| 2014/0363163 A1* | 12/2014 | Morper et al. | 398/58 |

* cited by examiner

Primary Examiner — Paul H Masur

(57) ABSTRACT

A method includes receiving, at a distribution management device, a request for a content item from a requesting local device. The distribution management device is at a first level of a content distribution architecture, the requesting local device is one of a plurality of local devices at a second level and each local device serves a plurality of sub devices at a third level. A determination whether the requested content item is available from the distribution management device is made. At least one other local device that has the requested content item is identified if the requested content item is not available. A minimum routing cost local device for the requested content to the requesting local device is determined based on the identified at least one other local device. A request for the requested content is sent to the identified minimum routing cost local device.

20 Claims, 8 Drawing Sheets

| SERVER 602 | MINIMUM PATH SERVERS 604 | COST 606 |
|---|---|---|
| LS-a | LS-b | 3 |
| | LS-c | 7 |
| | LS-d | 6 |
| | ... | ... |
| | LS-x | 2 |
| LS-b | LS-a | 5 |
| | LS-c | 7 |
| | LS-d | 6 |
| | ... | ... |
| | LS-x | 9 |
| LS-c | LS-a | 1 |
| | LS-b | 5 |
| | LS-d | 6 |
| | ... | ... |
| | LS-x | 2 |
| ... | ... | ... |
| LS-x | LS-a | 4 |
| | LS-b | 3 |
| | LS-c | 5 |
| | ... | ... |
| | LS-w | 8 |

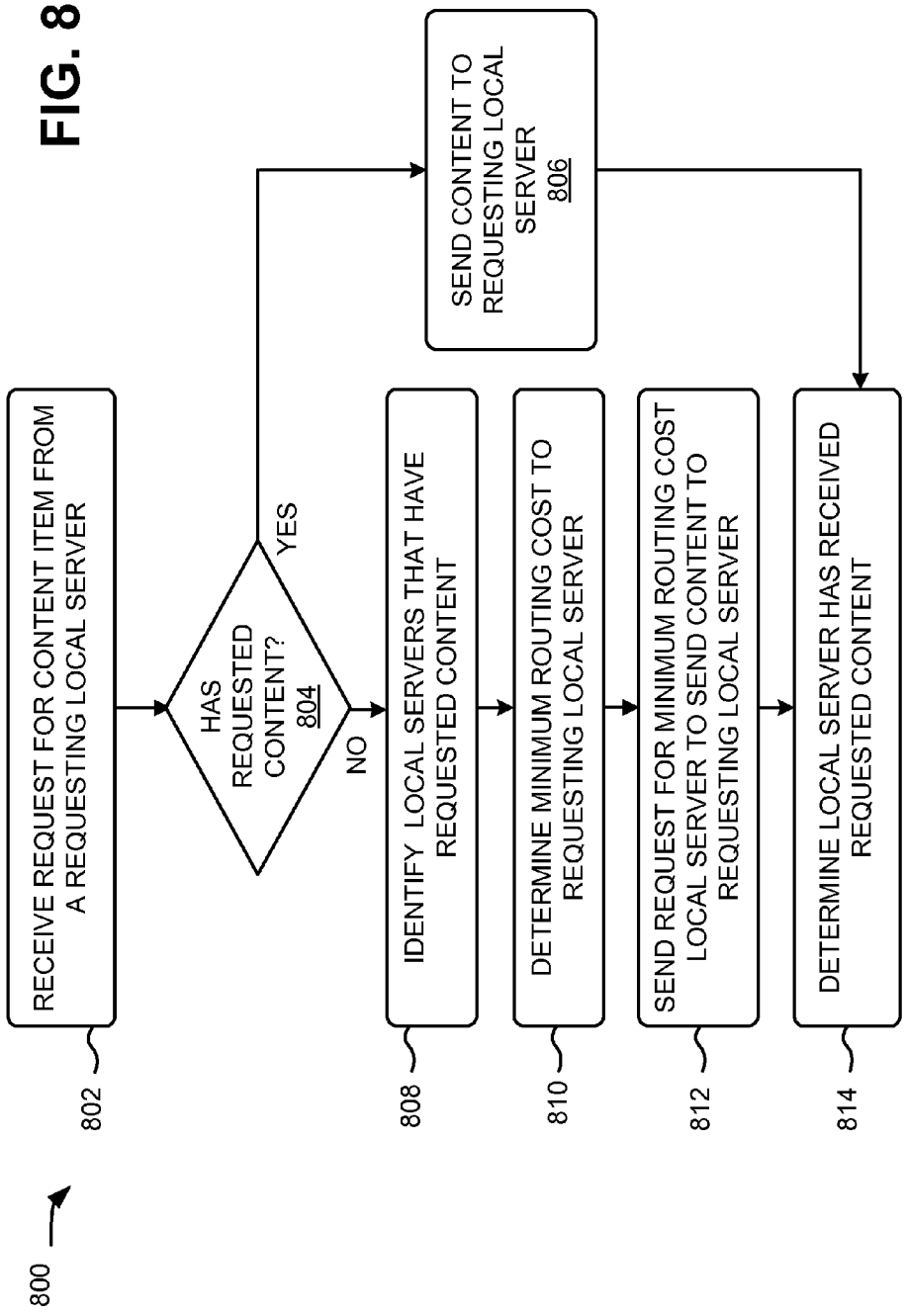

ROUTING ARCHITECTURE FOR CONTENT IN A NETWORK

BACKGROUND

In cloud networks, content servers are often located in open networks outside of customer premises networks. Content may be downloaded from the cloud networks to users' devices. The content may include movies, music, software, etc. Content servers may receive content requests from user devices and route the requested content to the user devices, for example, via wireless networks. The wireless networks typically use a fixed radio modulation scheme, known as a modulation and coding scheme (MCS), to provide unified decoding of content from signals received within a cell coverage area. Additionally, a forward error correction (FEC) scheme may be applied to the signal that carries the content at an application level to provide additional protection against packet loss.

BRIEF DESCRIPTION OF THE DRAWINGS

FIG. 6 is an exemplary minimum cost routing table;

FIG. 8 is a flow chart of an exemplary process for routing content in a content distribution network according to an implementation described herein.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide an architecture and mechanism for routing content traffic in cloud networks. The system and methods may increase efficiency and/or substantially reduce consumption of network resources used in providing the content to user devices. In one implementation the systems and methods may be applied to wireless networks, such as an evolved packet system (EPS) network (i.e., a long term evolution (LTE) network). The systems and methods are also applicable to other types of networks.

Figure 1:
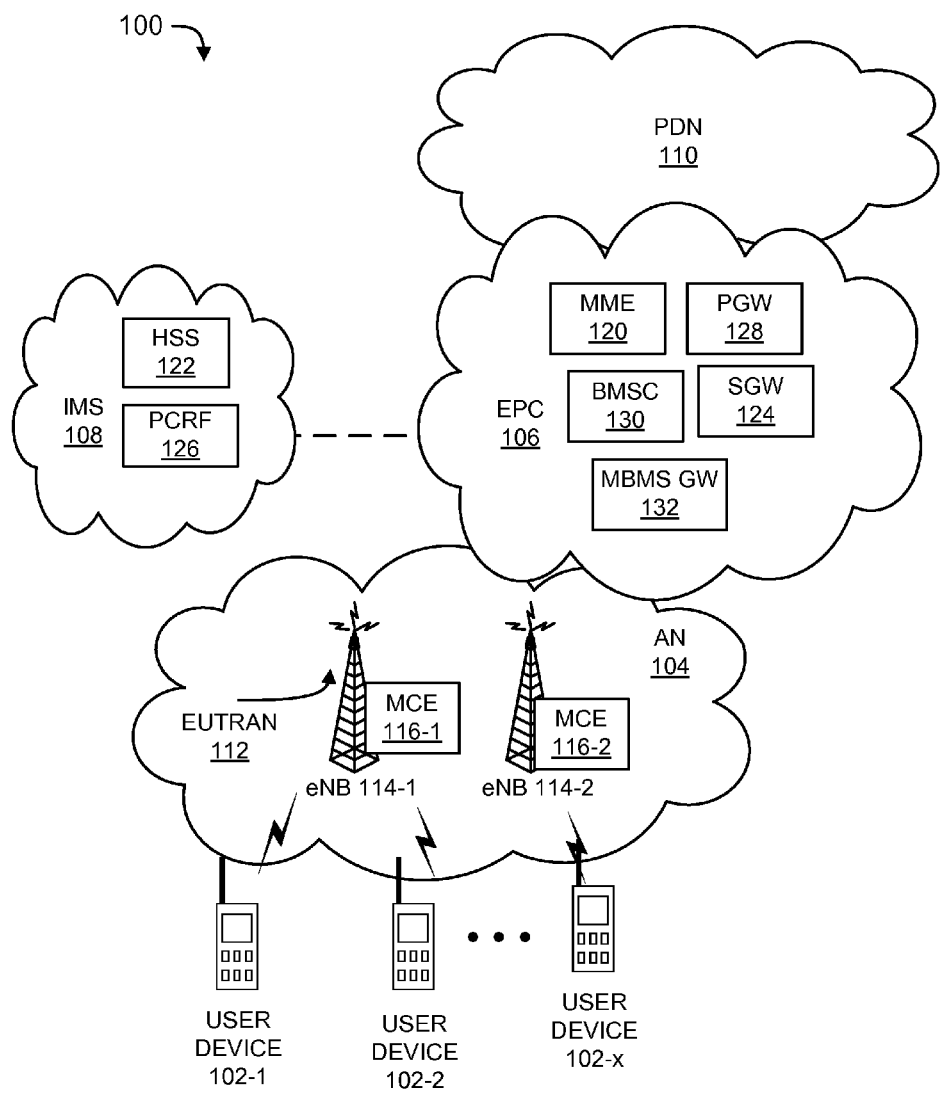
FIG. 1 is an exemplary long term evolution (LTE) network in which systems and/or methods described herein may be implemented.

FIG. 1 is a diagram of an exemplary LTE network 100. As illustrated, LTE network 100 includes a number of user devices 102-1, 102-2 and 102-*x* (collectively referred to as user devices 102 or individually as user device 102), an access network (AN) 104, an evolved packet core (EPC) network 106, an Internet Protocol Multimedia subsystem (IMS) network 108, and a packet data network (PDN) 110, such as the Internet or a proprietary packet data network. AN 104 may include an evolved universal terrestrial radio access network (E-UTRAN) 112 and a number of eNodeBs (eNBs) 114-1 and 114-2 or enhanced node base stations (collectively referred to as eNBs 114 or individually as eNB 114). Each eNB 114 may include a corresponding multicast coordination entity (MCE) 116 (respectively MCE 116-1, 116-2 and 116-*x*, collectively referred to as MCEs 116 or individually as MCE 116). EPC 106 may include a mobility management entity (MME) 120, a serving gateway (SGW) 124, and a PDN gateway (PGW) 128. A broadcast multicast service center (BMSC) 130, and a multimedia broadcast multicast service gateway (MBMS GW) 132 may also be deployed in EPC 106. IMS 108 may include a home subscriber server (HSS)/authentication, authorization, and accounting (AAA) server 122, and a policy and charging rules function (PCRF) device 126. Devices/networks of network 100 may interconnect via wired and/or wireless connections.

Three user devices 102, AN 104, EPC 106, PDN 110, E-UTRAN 112, two eNBs 114, MME 120, HSS 122, SGW 124, PCRF 126, PGW 128, BMSC 130, and MBMS GW 132 have been illustrated in FIG. 1 for simplicity. In practice, there may be more or fewer devices or components. For example, a typical network 100 includes millions of subscriber user devices 102, thousands of eNBs 114, hundreds of SGWs 124 and several PGWs 128 and MBMS GWs 130 effectively forming a hierarchical access network in which traffic passes from PDN 110 to user device 102 via, for example, a particular MBMS GW 132, PGW 128, SGW 124, and eNB 114.

User device 102 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer, a personal computer, a tablet computer, or other types of computation or communication devices. In an exemplary implementation, user devices 102 may include any device that is capable of communicating over access network 104, EPC network 106, and/or PDN 110. User device 102 operates according to one or more versions of the LTE communication standard.

Access network 104 includes a communications network that connects subscribers (e.g., user device 102) to a service provider. In one example, access network 104 may include a WiFi network or other access networks (e.g., in addition to E-UTRAN 112). EPC 106 may include a core network architecture of the Third generation partnership project (3GPP) LTE wireless communication standard. PDN 110 includes a network that provides data services (e.g., via packets or any other Internet protocol (IP) datagrams). For example, PDN 110 may include the Internet, an intranet, an asynchronous transfer mode (ATM) network, etc.

E-UTRAN 112 includes a radio access network capable of supporting high data rates, packet optimization, large capacity and coverage, etc. E-UTRAN 112 includes a number of eNBs 14.

eNBs 114 includes network devices that operate according to one or more versions of the LTE communication standard. For example, eNBs 114 may be configured to respond to user device requests, forward information regarding user devices 102 to MME 120 and/or SGW 124, set up tunneling sessions with other devices (e.g., SGW 124 and PGW 128), etc. eNBs 114 are base stations in network 100 and may include control plane connections to other network elements. eNBs 114 may include MCEs 116.

MCEs 116 may allocate radio resources used by all eNBs 114 in the multicast/broadcast single frequency network (MBSFN) area for multi-cell MBMS transmissions using MBSFN operations. The MBSFN area is a specific area in which multiple cells transmit the same content using a single frequency network. Each eNB 114 may have an associated MCE 116, which may be integrated into the eNB 114. Alternatively, MCEs 116 may be part of another network element. When the MCE 116 is part of another network element, each eNB 114 is served by a single MCE 116. In addition to allocation of the time/frequency radio resources, MCEs 116 may also determine or implement further details of the radio configuration, such as the MCS. The MCE may also be involved in MBMS session control signaling.

MME 120 is responsible for idle mode tracking and paging procedures (e.g., including retransmissions) for user device 102. For example, MME 120 maintains information regarding a current state (e.g., powered on, location, etc.) of user device 102. MME 120 is also involved in the bearer activation/deactivation process (e.g., for user device 102) and operates to choose a particular SGW 124 for user device 102 at an initial attach time and at a time of intra-LTE handover. In addition, MME 120 authenticates user device 102 (e.g., via interaction with HSS 122). Non-access stratum (NAS) signaling terminates at MME 120 and MME 120 generates and allocates temporary identities to user equipment (e.g., user device 102).

Furthermore, MME 120 may check authorization of user device 102 to connect to a service provider's Public Land Mobile Network (PLMN) and may enforce roaming restrictions for user device 102. MME 120 may be a termination point in EPC network 106 for ciphering/integrity protection for NAS signaling and may handle security key management. MME 120 may provide a control plane function for mobility between LTE and second generation mobile telecommunications or third mobile generation telecommunications (2G/3G) 3GPP access networks with an S3 interface (i.e., an interface that provides the connection between a serving general packet radio service (GPRS) support node (SGSN) and MME 120 in an LTE network) terminating at MME 120. MME 120 may also terminate an Sha interface (which enables transmission of subscription and authentication data) towards HSS 122 for roaming user devices 102.

HSS/AAA 122 is configured to include a master user database that supports devices on PDN 110 that handle calls, such as proxy devices, session border controllers, etc. HSS/AAA 122 may contain subscription-related information (e.g., subscriber profiles), may perform authentication and authorization of a user based on requests received from MME 120, and may provide information about a subscriber's location and IP information.

SGW 124 routes and forwards user data packets, acts as a radio mobility anchor for a user plane during inter-eNB handovers, and also acts as a radio anchor for mobility between LTE and other 3GPP technologies (referred to as "inter-3GPP mobility"). As shown, SGW 124 is connected to eNBs 114 to provide a radio layer mobility control plane. In addition, SGW 124 manages and stores contexts associated with user device 102 (e.g., parameters of an IP bearer service, network internal routing information, etc.).

PCRF 126 provides policy control decision and flow based charging control functionalities. PCRF 126 may provide network control regarding service data flow detection, gating, quality of service (QoS) and flow based charging, etc. PCRF 126 may determine how a certain service data flow shall be treated, and may ensure that user plane traffic mapping and treatment is in accordance with a user's subscription profile.

PGW 128 includes one or more data transfer devices (or network devices), such as a gateway, a router, a switch, a firewall, a network interface controller (NIC), a hub, a bridge, a proxy server, an optical add/drop multiplexer OADM, or some other type of device that processes and/or transfers data. PGW 128 provides connectivity of user device 102 to external packet data networks (e.g., to PDN 110) by being a traffic exit/entry point for user device 102. As described briefly above, user device 102 may connect to PGW 128 via one or more tunnels established between eNB 114 and PGW 128, such as one or more GPRS Tunneling Protocol (GTP) tunnels. User device 102 may simultaneously connect to more than one PGW for accessing multiple PDNs. PGW 128 may perform policy enforcement, packet filtering for each user, charging support, lawful intercept, and packet screening. PGW 128 may also act as an anchor for mobility between 3GPP and non-3GPP technologies.

BMSC 130 may be a functional entity that manages provision of multicast services or broadcast services to user device 102 and an end-user, such as currently implemented in 2G and 3G MBMS architectures. BMSC 130 may provide an entry point for content providers or other broadcast/multicast source which is external to the network. BMSC 130 may perform authorization, scheduling, and security procedures in support of the multicast services or broadcast services. For example, BMSC 130 may provide authorization for terminals requesting to activate an MBMS service. BMSC 130 may schedule broadcast/multicast sessions. BMSC 130 may also implement integrity and confidentiality protection of MBMS data and may issue MBMS session announcements.

BMSC 130 may support MBMS bearer signaling that sets up and releases context at the establishment and termination of MBMS sessions. BMSC 130 may also support user related signaling, e.g., for multicast session authorization, or user session joining or detaching from multicast sessions.

MBMS GW 132 may send/broadcast MBMS packets to each eNB 114 transmitting the (broadcast or multicast) service. MBMS GW 132 may be a logical entity that is present between BMSC 130 and eNBs 114 in network 100. MBMS GW 132 may be part of another network element, such as a router, etc. MBMS GW 132 may use IP multicast to forward MBMS user data to eNB 114. MBMS GW 132 may perform MBMS session control signaling (e.g., session start/stop) towards the E-UTRAN 112 via MME 120.

In implementations described herein, systems and methods for routing content traffic to requesting user devices 102 in a cloud network is provided. The systems and methods may substantially reduce consumption of network resources used in providing the content to user devices 102. In one implementation the systems and methods may be applied to wireless networks. The systems and methods are also applicable to other types of networks.

Figure 2:
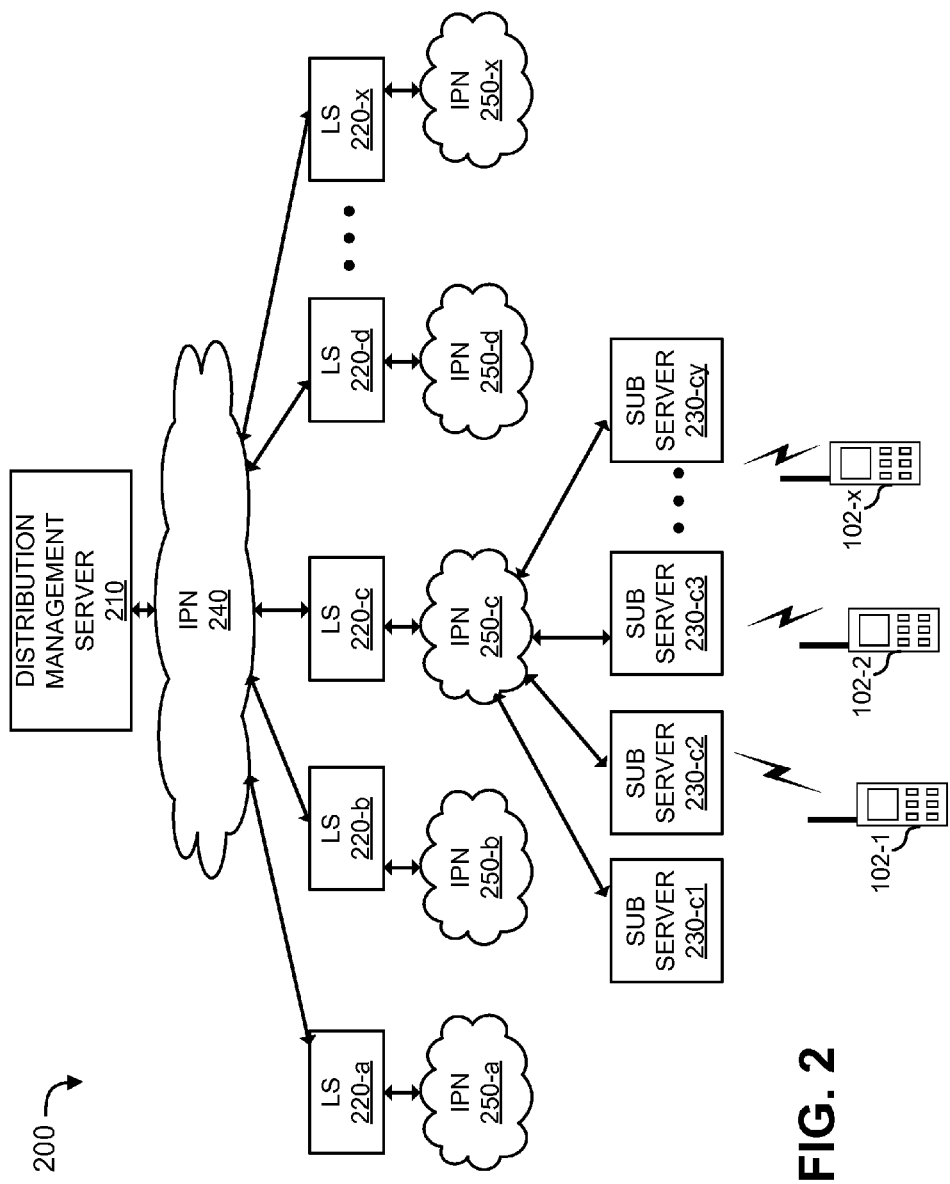
FIG. 2 is a diagram of an exemplary content distribution network architecture in which systems and/or methods described herein may be implemented.

FIG. 2 is a diagram of an exemplary content distribution network architecture 200. Architecture 200 may include servers arranged in a hierarchal manner, including a distribution management server 210 (also referred to as master server 210), a plurality of local servers 220 (local servers 220-*a* through 220-*x*), and a plurality of sub servers 230 that may correspond to each local server 220 (shown as sub servers 230-*cl* through 230-*cy*, corresponding to (or associated with) local server 220). Distribution management server 210 may be connected to each local server 220 via Internet Protocol networks 240 (shown in FIG. 2 as IPN 240), and each local server 220 may be connected to sub servers 230 via IP network 250*a* through 250-*x* (shown in FIG. 2 as IPN 250-*a* to IPN 250-*x*). The exemplary configuration illustrated in FIG. 2 is provided for simplicity. It should be understood that a typical architecture may include more or fewer components than illustrated in FIG. 2. For example, although a single distribution management server 210 is shown, network architecture 200 may include additional distribution management servers 210 (e.g., architecture may include a multiple distribution management servers 210 that provide redundancy in event of failure of a particular distribution management server(s) 210). Additionally, network architecture 200 may include a number of other networks.

Distribution management server 210 may be implemented at a first hierarchal level of architecture 200, local servers 220 may be at a second hierarchal level (that is lower than the first hierarchal level) and sub servers 230 may be at a third hierarchal level of architecture 200 (i.e., a hierarchal level that is lower than the second hierarchal level). User devices 102 may be located at a lowest level of architecture 200. A routing system may be implemented in architecture 200 for routing content traffic to different user devices 102. Although other implementations of content distribution network architectures may have more levels of servers in the hierarchy, architecture 200 includes only three levels of hierarchy of servers for clarity of presentation.

User devices 102 may be located at widely dispersed geographical locations. Local servers 220 may be distributed over wide geographical areas to provide support for the user devices 102. Sub servers 230 may be associated with particular local servers 220 and may be implemented within a sub-division of a geographical area associated with a particular local server 220.

Distribution management server 210 may manage routing of the content traffic to user devices 102 based on the proximity (in architecture 200) of servers that contain requested content in architecture 200, for example as described below with respect to FIG. 4. Distribution management server 210 may include information for routing requested content in network 100 to requesting servers or devices and other server information that may be accessed to perform functions as a content management entity (e.g., content lists, server capacity measurements, network management and control information, etc.). Additionally, distribution management server 210 may include content items that may be provided in response to requests for content from user devices 102. Distribution management server 210 may directly interface with user devices 210, or alternatively may interface with local servers 220 distributed over wide networks to effectively serve the user devices 102.

Local servers 220 may store content items (e.g., movies, video games, software, etc.) that are frequently accessed by the user devices 102 that the local server 220 serves. Local servers 220 may also have routing information (e.g., routing tables 500, 600 and 700, described below) that may be accessed to route the content traffic to the user devices 102 and other servers (e.g., other local servers 220 or sub servers 230). Local servers 220 may be located in various places in a network. In LTE network 100, for example, the local servers 220 may be collocated at PGW 128 or close to PGWs 128. Local servers 220 may interface directly with user devices 102, but, in some instances with large network coverage areas and many user devices 102, local servers 220 may interface with user devices 102 via servers located closer to user devices 102, such as sub server 230.

Sub servers 230 may store content items that are frequently accessed by the user devices 102 that a particular sub server 230 serves (e.g., user devices 102 within a predetermined geographical area covered by a network, such as IPN 250-c). Sub servers 230 may also have routing information to route the content traffic to user devices 102 and other servers. Sub servers 230 may be located depending on where local servers 220 are deployed. If local servers 220 are deployed in PGWs 128, sub servers 230 may be located in SGW 124 or eNBs 114 (or base stations).

User devices 102 may download content (for example, video) based on user input. In wireless network, for example, user devices 102, such as smart phones, tablets, notebooks, etc., may download or stream contents from sub servers 230, local servers 220 or distribution management servers 210.

Servers in architecture 200 may provide content items based on requests from lower level servers or user devices 102 (e.g., local servers 220, sub servers 230, with respect to distribution management server 210 and local servers 220, respectively). If the server does not have a requested content item, the server may send the request to a next higher level server. For example, user device 102-1 may request a video content item from sub server 230-$cl$ (where user device 102-1 is served by sub server 230-$cl$). Sub server 230-$cl$ may have previously stored the requested content item (e.g., if the requested content is already stored in sub server 230-$cl$, for example based on popularity of the content item with user devices 102 served by the sub server 230-$cl$). Sub server 230-$cl$ may directly route the content traffic to user device 102-1. If the requested content is not stored in association with sub server 230-$cl$, sub server 230-$cl$ may send the request to local server 220-$c$ (in instances in which sub server 230-$cl$ is served by local server 220-$c$). Local server 220-$c$ may determine if it has previously stored the requested content. If local server 220-$c$ has previously stored the requested content, local server 220-$c$ may route the content item(s) directly to sub server 230-$cl$, and sub server 230-$cl$ may route the content item(s) to user device 102-1. If local server 220-$c$ has not previously stored the requested content, local server 220-$c$ may send the request to distribution management server 210. Distribution management server 210 may process the request as described below with respect to process 800 and FIG. 8.

Figure 3:
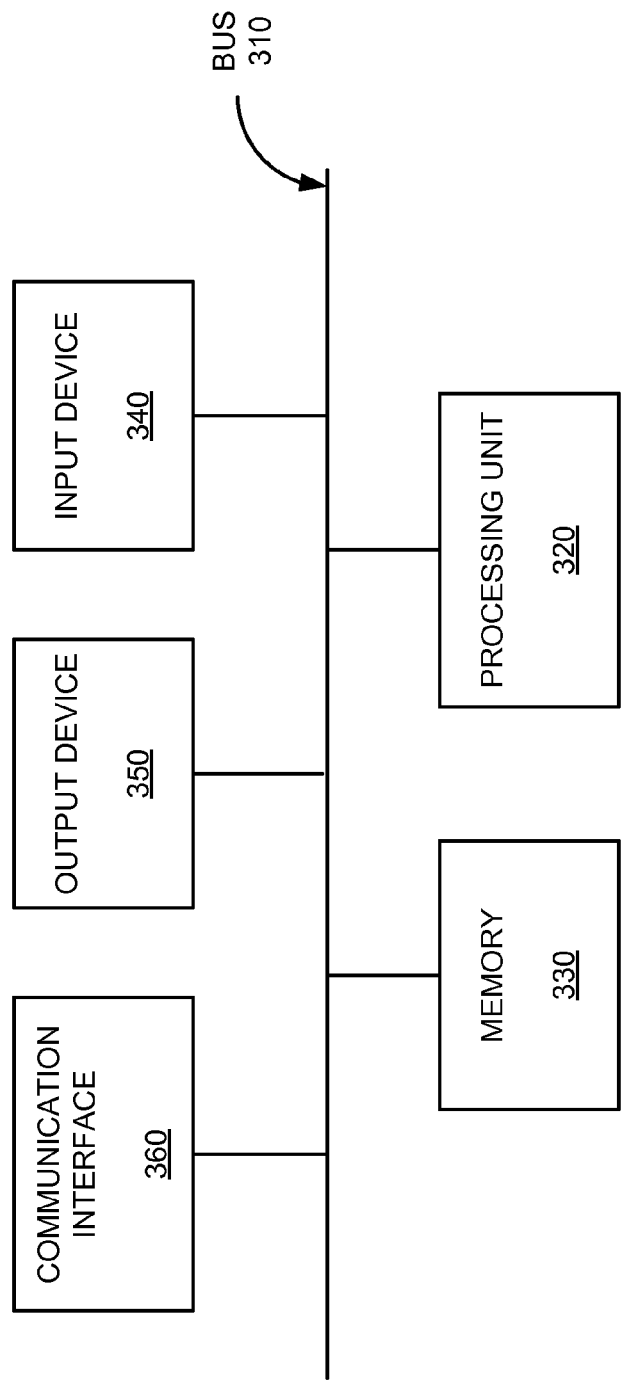
FIG. 3 illustrates an exemplary configuration of one or more of the components of FIGS. 1 and 2.

FIG. 3 is a diagram of example components of a device 300. Each of user device 102, one or more devices in AN 104, EPC 106, PDN 110, E-UTRAN 112, eNB 114, MME 120, HSS 122, SGW 124, PCRF 126, PGW 128, BMSC 130, MBMS GW 132, distribution management server 210, local servers 220, and sub server 230, as described in FIGS. 1-2 above, may include one or more devices 300. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include mechanisms for communicating with other devices, such as other devices of network 100.

As described herein, device 300 may perform certain operations in response to processing unit 320 executing machine-readable instructions contained in a computer-readable medium, such as memory 330. A computer-readable medium may be defined as a non-transitory memory device. A memory device may include space within a single physical memory device or spread across multiple physical memory devices. The machine-readable instructions may be read into memory 330 from another computer-readable medium or from another device via communication interface 360. The machine-readable instructions contained in memory 330 may cause processing unit 320 to perform processes described herein. Alternatively, hardwired circuitry may be used in place of or in combination with machine-readable instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. As an example, in some implementations, input device 340 and/or output device 350 may not be implemented by device 300. In these situations, device 300 may be a "headless" device that does not explicitly include an input or an output device. Alternatively, or additionally, one or more components of device 300 may perform one or more other tasks described as being performed by one or more other components of device 300.

Figure 4:
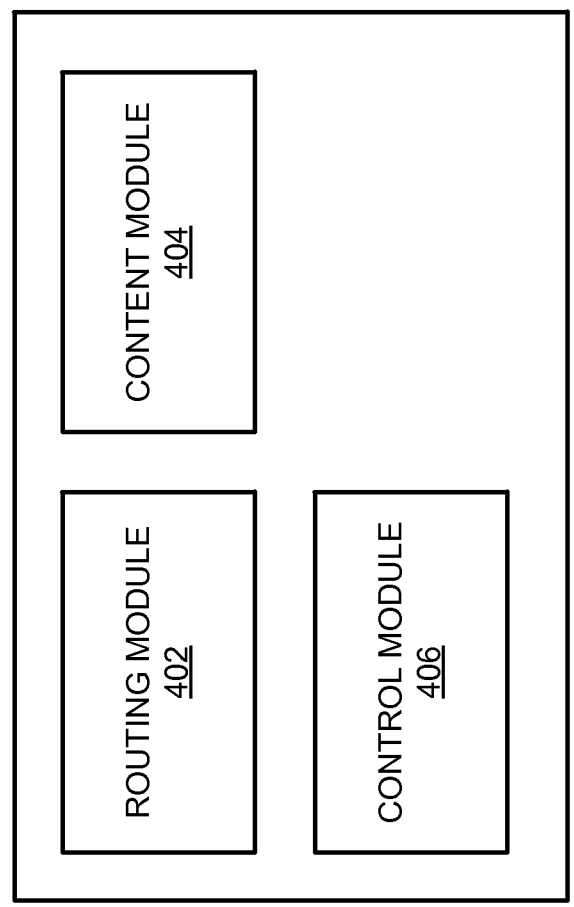
FIG. 4 is a block diagram of a distribution management server.

FIG. 4 is an exemplary functional block diagram of distribution management server 210 according to an exemplary implementation. Distribution management server 210 may include a routing module 402, a content module 404 and a control module 406. The logical blocks illustrated in FIG. 4 may be implemented in machine-readable instructions, hardware, or a combination of hardware and machine-readable instructions. For example, in one implementation, all or some of the logical blocks illustrated in FIG. 4 may be implemented by processing unit 320 (FIG. 3) executing machine-readable instructions stored in, for example, memory 330. Functions associated with distribution management server 210 are also described with respect to FIGS. 5, 6, and 7, and routing tables 500, 600 and 700.

Routing module 402 may determine routing paths for requested content in architecture 200. Routing module 402 may determine servers that include requested content items. Routing module 402 may identify routing paths and instructions based on routing tables, such as routing tables 500, 600 and 700, described herein below. Routing module 402 may determine routing information in tables 500, 600, and 700 based on information received from and/or about local servers 220.

Content module 404 may include content stored in association with distribution management server 210. For example, content module 404 may include digital content, such as movies, music, software, etc. Content module 404 may include content items based on frequency of requests for content (e.g., in conjunction with content stored at local servers 220). For example, content module 404 may store and/or provide content items for local storage (e.g., at local servers 220, sub servers 230) based on a predetermined number of requests received for the content (e.g., within a predetermined time).

Control module 406 may perform control and management functions for implementing routing of content in architecture 200. Control module 406 may determine instructions for lower level servers based on routing paths and instructions to provide requested content to user devices 102. Control module 406 may issue commands to local servers 220 to implement routing of content to requesting user devices 102.

Distribution management server 210 may receive requests for content in architecture 200 (e.g., in instances in which lower level servers have not previously stored the requested content items). Distribution management server 210 may distribute content to lower level servers and instruct the servers to store content based on a volume of requests received at the lower level server or other lower level servers (e.g., based on similar demographics or download history associated with two different lower level servers, distribution management server 210 may route content to one server based on requests received at the other server). For example, distribution management server 210 may compare content requested by at least two local servers 220 by associated user devices 102 and direct storage of content based on the similarity of content requested at the at least two local servers 220.

Distribution management server 210 may manage distribution of content based on instructions and content provided to lower level servers closer to requesting user devices 102. Distribution management server 210 may manage network resources in a substantially more efficient and robust manner than, for example, a single content server, which may incur a significant delay when the user device 102 is located far away from the content server, and a single failure in the content server or in the network may cause catastrophic impact on content download capabilities of the user devices 102. In some instances, distribution management server 210 may directly interface with user devices 102 to provide content.

Figure 5:
FIG. 5 is an exemplary routing table.

FIG. 5 is an exemplary routing table 500. Table 500 includes a listing of content 502 (content 1 to content 5, shown in the first column) and a corresponding listing of servers 510 in which the content is stored (LS-a to LS-e, corresponding to local servers 220-a to 220-e, respectively, shown in the second column). Table 500 may be stored in association with distribution management server 210 and may be accessed in implementing routing decisions for content requested by user devices 102.

Distribution management server 210 may receive a request for content from a lower level server, e.g., local server 220-c. Distribution management server 210 may access table 500 upon receiving the request from local server 220-c. If distribution management server 210 has the content (e.g., stored in an associated local storage device), distribution management server 210 may send the requested content to local server 220-c. If distribution management server 210 does not have the requested content, distribution management server 210 may send the request to other local servers 220 that have the content based on listing information in routing table 500.

As shown in table 500, content 1 is stored in local server 220-a (labeled LS-a), and content 2 is stored in both local server 220-e and local server 220-a, etc. Content listed in association with each local server 220 includes content stored in the local servers 220 and content stored in the sub servers 230 that the local server 220 serves. If the content is not stored in the local server 220 (e.g., local server 220-c), but is stored in a sub server 230 (e.g., sub server 230-cl) that is served by the local server (local server 220-c), local server 220-c is considered to have the content, from a listing and routing perspective of distribution management server 210.

In an instance in which the requested content is content 3, distribution management server 210 may determine that local server 220-b has the requested content (based on a listing in table 500). Distribution management server 210 may send the request to local server 220-*b*, and the local server 220-*b* may send the requested content to local server 220-*c*. Local server 220-*c* may send the requested content to sub server 230-*cl* and sub server 230-*cl* may then send the requested content to the requesting user device 102.

FIG. 6 is a minimum cost routing table 600. Table 600 includes a listing of servers 602 (LS 220-*a* to LS 220-*x*, first column), a listing of minimum path servers 604 corresponding to each of servers LS 220-*a* to LS 220-*x* (second column), and a corresponding routing cost 606 (third column). Table 600 may be stored in association with distribution management server 210 and may be accessed in implementing routing decisions for content requested by user devices 102.

Table 600 includes, for each local server 220, a corresponding routing cost 606 to/from each other local server 220. Distribution management server 210 may determine the cost 606 based on information provided by network operators (e.g., based on particular requirements of the network operators). The routing cost 606 may be measured in a number of hops, a distance (e.g., in miles), link speed, or other variables, such as traffic demand patterns, bandwidth availability, monetary cost, etc. In other instances the cost may be a weighted average of more than one variable, such as a weighted sum of hops, distance, bandwidth, monetary cost, etc. Distribution management server 210 may compute these minimum routing paths (i.e., routing costs 606) and/or dynamically update the routing costs 606 based on routing protocols such as open shortest path first (OSPF), border gateway protocol (BGP), etc.

In an instance in which multiple local servers 220 have the requested content, distribution management server 210 may compare routing costs 606 to determine a minimum routing cost. For example in table 500, content 4 is stored in both local server 220-*b* and local server 220-*d*. Distribution management server 210 may select the local server 220 in minimum cost routing table 600 that provides routing paths with minimum cost for the requesting local server 220-*c*.

In table 600, the routing paths from listed servers 602 to minimum path servers 604 with corresponding cost 606 are shown. In the second row of table 600, the routing cost 606 from local server 220-*a* (shown as LS-a in the second row (first non-header row) of the first column) to local server 220-*b* is 3 (cost 606 shown in the second row of the third column), local server 220-*a* to local server 220-*c* is 7, and local server 220-*a* to local server 220-*d* is 6, etc. Distribution management server 210 may identify a particular local server 220 that is requesting content in the first column of table 600 (LS-c, in this instance). Distribution management server 210 may compare the routing cost 606 associated with each listed path that includes the requested content, for example, 'from local server 220-*c* to local server 220-*a*' and 'from local server 220-*c* to local server 220-*e*'. If the minimum cost path server 604 is local server 220-*a* instead of local server 220-*e*, then distribution management server 210 may send the request to the local server 220-*a*, and the local server 220-*a* may send the requested content to local server 220-*c*. Local server 220-*c* may then send the requested content to sub server 230-*cl* and subsequently to the requesting user device 102.

Figure 7:
FIG. 7 is an exemplary combined routing table.

FIG. 7 is a combined routing table 700. Table 700 includes a listing of content 502 (content 1 to content 5, shown in first column) and a corresponding listing of servers 710 and routing costs (e.g., content 1 corresponds to LS 220-*a*(3), shown in the second column) with respect to local server 220-*c* (i.e., distribution management server 210 may maintain a separate table 700 for each local server 220). Distribution management server 210 may determine the listing of content 502 and the corresponding listing of servers 710 and routing costs based on network information provided by network elements. Table 700 may be stored in association with distribution management server 210 and may be accessed in implementing routing decisions for content requested by user devices 102. Distribution management server 210 may access a routing table 700 based on requests provided by each local server 220.

Distribution management server 210 may maintain table 700 that includes content along with each local server 220 and associated routing costs, as indicated by the numbers enclosed parenthesis. The units for routing costs are the same for each server and a higher number may indicate greater routing cost. For example, content 2 is stored both in local server 220-*a* and local server 220-*e*. The routing cost for local server 220-*e* is 7, which is lower than the 11 of local server 220-*a*. Therefore, distribution management server 210 may select local server 220-*a* for the routing path. Table 700 may be distributed to redundant distribution management servers 210 and/or multiple distribution management servers 210 that are located in different geographic areas.

Distribution management server 210 may distribute corresponding combined routing tables 700 to local servers 220. Similarly, in some instances, local servers 220 may determine combined routing tables 700 for sub servers 230. In these instances, servers at a particular hierarchal level may request content from other servers at the same hierarchal level without using higher level servers as an intermediary for each request. For example, local servers 220 may select listed content 502 from table 700 and identify corresponding local servers 220 from which to request content based on the routing cost listed with the local servers 220.

FIG. 8 is a flow chart of an exemplary process for error protection of a broadcast/multicast transmission according to implementations described herein. Process 800 is described with respect to architecture 200 shown in FIG. 2, for illustrative purposes. In one implementation, process 800 may be performed by distribution management server 210. In another implementation, some or all of process 800 may be performed by another device or group of devices, including or excluding distribution management server 210.

Requests for content associated with process 800 may initiate at user devices 102 in architecture 200. A user device 102 may request content from a sub server 230. If the sub server 230 has the requested content, the sub server 230 may send the content to the requesting user device 102. If the sub server 230 does not have the requested content, the sub server 230 may request the content from an associated local server 220. If the local server 220 has the content, the local server 220 may send the content to the requesting user device 102. If the local server 220 does not have the content, the local server 220 may request the content from distribution management server 210.

Processing, at distribution management server 210, may begin with distribution management server 210 receiving a request for content from a local server 220 (block 802). For example, distribution management server 210 may receive a request for content associated with a user device 102 from local server 220 in response to a determination that the local server 220 does not have the requested content.

At block 804, distribution management server 210 may determine whether distribution management server 210 currently has the requested content (i.e., distribution management server 210 may determine whether the requested content item is available). For example, distribution management server 210 may search a list of content stored locally in an associated storage device.

At block 806, if the distribution management server 210 has the requested content item (block 804, yes), distribution management server 210 may send the requested content to the requesting local server 220. The local server 220 may then send the requested content to the requesting sub server 230, which may send the content to the requesting user device 102.

At each hierarchal level of architecture 200, servers may store requested content based on a number of requests for the particular content item exceeding a predetermined threshold. For example, each sub server 230 may include content requested a number of times by associated user devices 102 that exceeds a predetermined threshold (e.g., a number of requests within a given time). Similarly, local servers 220 may be programmed to store content that is requested a particular number of times by sub servers 230 over a period of time. Additionally, distribution management server 210 may provide instructions to store content at lower level servers based on activity or expected activity in architecture 200. For example, pre-release movies may be distributed to sub servers 230 or local servers 220 based on demographics of the area covered by the servers. Accordingly, for subsequent requests, the local servers 220 and sub servers 230 may have the requested content and thereby reduce network resources used in providing content to user devices 102.

If the distribution management server 210 does not have the requested content item (block 804, no), distribution management server 210 may identify local servers 220 that have the requested content (block 808). For example, distribution management server 210 may access a routing table, such as table 500 that includes a listing of content.

Distribution management server 210 may determine a minimum routing cost to the requesting local server 220 from local servers 220 that have the requested content (block 810). For example, distribution management server 210 may access routing tables, such as routing tables 500, 600, and/or 700. Distribution management server 210 may identify a minimum routing cost local server 220 based on the requesting local server 220.

Distribution management server 210 may send a request for content associated with the requesting local server 220 to the identified minimum routing cost local server 220 at (block 812). The minimum routing cost local server 220 may send the requested content to the requesting local server 220. The requesting local server 220 may send the content item to the requesting sub server 230, which may send the content to the requesting user device 102.

Distribution management server 210 may determine that requesting local server 220 has received the requested content (block 814). For example, a predetermined time may elapse after which distribution management server 210 may identify that the requested content has been received based on lack of a repeat request for the content. Alternatively, requesting local server 220 may send a receipt confirmation to distribution management server 210 when the content has been received.

Systems and/or methods described herein may provide an architecture and mechanism for routing for content traffic in a cloud network. The routing may be provided based on a lowest cost. Systems and methods may allow content distribution efficiency for a plurality of local servers and sub servers that serve different sections of a wide geographic area.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
receiving, at a distribution management device, a request for a content item from a requesting local device, wherein the distribution management device is at a first level of a content distribution architecture, the requesting local device is one of a plurality of local devices at a second level and each local device serves a plurality of sub devices at a third level and wherein each local device is located at a packet data network gateway and each sub device is located at a serving gateway;
determining whether the requested content item is available from the distribution management device;
sending the requested content item to the requesting local device in response to determining that the requested content item is available;
identifying at least one of the remaining local devices that has the requested content item in response to determining that the requested content is not available;
identifying a minimum routing cost local device for routing the requested content to the requesting local device based on the identified at least one other local device that has the requested content item; and
sending a request for the requested content to the identified minimum routing cost local device.

2. The computer-implemented method of claim 1, further comprising:
determining the minimum routing cost local device based on at least one of a number of hops, a distance, a link speed, a traffic demand patterns, or a bandwidth availability.

3. The computer-implemented method of claim 2, further comprising:

determining the minimum routing cost based on a weighted average of at least two of the number of hops, the distance, the link speed, the traffic demand patterns, or the bandwidth availability.

4. The computer-implemented method of claim 1, wherein the minimum routing cost local device is operable to send the requested content item to at least one sub device and the at least one sub device is operable to send the requested item to a requesting user device.

5. The computer-implemented method of claim 4, further comprising:
determining that the requesting user device has received the requested content based on one of a receipt notification or a predetermined time without a non-receipt notification.

6. The computer-implemented method of claim 1, wherein the distribution management device is one of a plurality of redundant distribution management devices.

7. The computer-implemented method of claim 1, further comprising:
comparing content requested at at least two local devices by associated user devices; and
directing storage of content based on similarity of content requested at the at least two local devices.

8. The computer-implemented method of claim 1, storing, at the local devices, content requested by sub devices a number of times that exceeds a predetermined threshold by associated sub devices; and
storing, at the associated sub devices, content requested a number of times that exceeds a predetermined threshold by associated user devices.

9. The computer-implemented method of claim 1, wherein identifying the at least one other local device that has the requested content item further comprises:
identifying content stored by one or more sub devices associated with the at least one other local device.

10. The computer-implemented method of claim 1, wherein each of the local devices includes routing information for routing content to the other local devices.

11. The computer-implemented method of claim 1, further comprising:
interfacing, by the distribution management device, directly with at least one user device to provide content.

12. The computer-implemented method of claim 1, further comprising:
updating a minimum routing path for the content based on at least one of an open shortest path first, or a border gateway protocol.

13. The computer-implemented method of claim 1, further comprising:
determining a listing of minimum routing cost local devices associated with a selected local device;
determining a listing of content associated with each listed minimum routing cost local device; and
distributing the listing of minimum routing cost local devices and the listing of content associated each listed minimum routing cost local device to the selected local device, wherein the selected local device is operable to request content from each listed minimum routing cost local device based on the listing of content associated each listed minimum routing cost local device.

14. A distribution management device, comprising:
a memory to store a plurality of instructions; and
a processor configured to execute instructions in the memory to:
receive a request for a content item from a requesting local device, wherein the distribution management device is at a first level of a content distribution architecture, the requesting local device is one of a plurality of local devices at a second level and each local device serves a plurality of sub devices at a third level and wherein each local device is located at a packet data network gateway and each sub device is located at a serving gateway;
determine whether the requested content item is available from the distribution management device;
send the requested content item to the requesting local device in response to determining that the requested content item is available;
identify at least one of the other local devices that has the requested content item in response to determining that the requested content item is not available;
determine a minimum routing cost local device for routing the requested content to the requesting local device based on the identified at least one other local device that has the requested content item; and
send a request for the requested content to the minimum routing cost local device.

15. The device of claim 14, wherein the processor is further configured to:
determine the minimum routing cost local device based on at least one of a number of hops, a distance, a link speed, a traffic demand patterns, or a bandwidth availability.

16. The device of claim 14, wherein the processor is further configured to:
compare content requested at at least two local devices by associated user devices; and
direct storage of content based on similarity of content requested at the at least two local devices.

17. The device of claim 14, wherein, when identifying the at least one other local device that has the requested content item, the processor is further configured to:
identify content stored by one or more sub devices associated with the at least one other local device.

18. A non-transitory computer-readable medium including instructions to be executed by a processor, the instructions including one or more instructions, when executed by the processor, for causing the processor to:
receive a request for a content item from a requesting local device, wherein the request is received at a first level of a content distribution architecture, the requesting local device is one of a plurality of local devices at a second level and each local device serves a plurality of sub devices at a third level and wherein each local device is located at a packet data network gateway and each sub device is located at a serving gateway;
determine whether the requested content item is available from a distribution management device;
send the requested content item to the requesting local device in response to determining that the requested content item is available;
identify at least one other local device that has the requested content item in response to determining that the requested content item is not available;
determine a minimum routing cost local device for the requested content to the requesting local device based on the identified at least one other local device that has the requested content item;
send a request for the requested content to the minimum routing cost local device; and
determine that the requesting local device has received the requested content based on one of a receipt notification or a predetermined time without a non-receipt notification.

19. The non-transitory computer-readable medium of claim 18, wherein the one or more instructions further includes instructions for causing the processor to:
- determine the minimum routing cost local device based on at least one of a number of hops, a distance, a link speed, a traffic demand patterns, or a bandwidth availability.

20. The non-transitory computer-readable medium of claim 19, wherein the one or more instructions further includes instructions for causing the processor to:
- determine the minimum routing cost based on a weighted average of at least two of the number of hops, the distance, the link speed, the traffic demand patterns, or the bandwidth availability.

* * * * *